March 20, 1962  R. A. COUCHOT  3,025,655
HEDGE TRIMMER
Filed Sept. 17, 1959  4 Sheets-Sheet 2
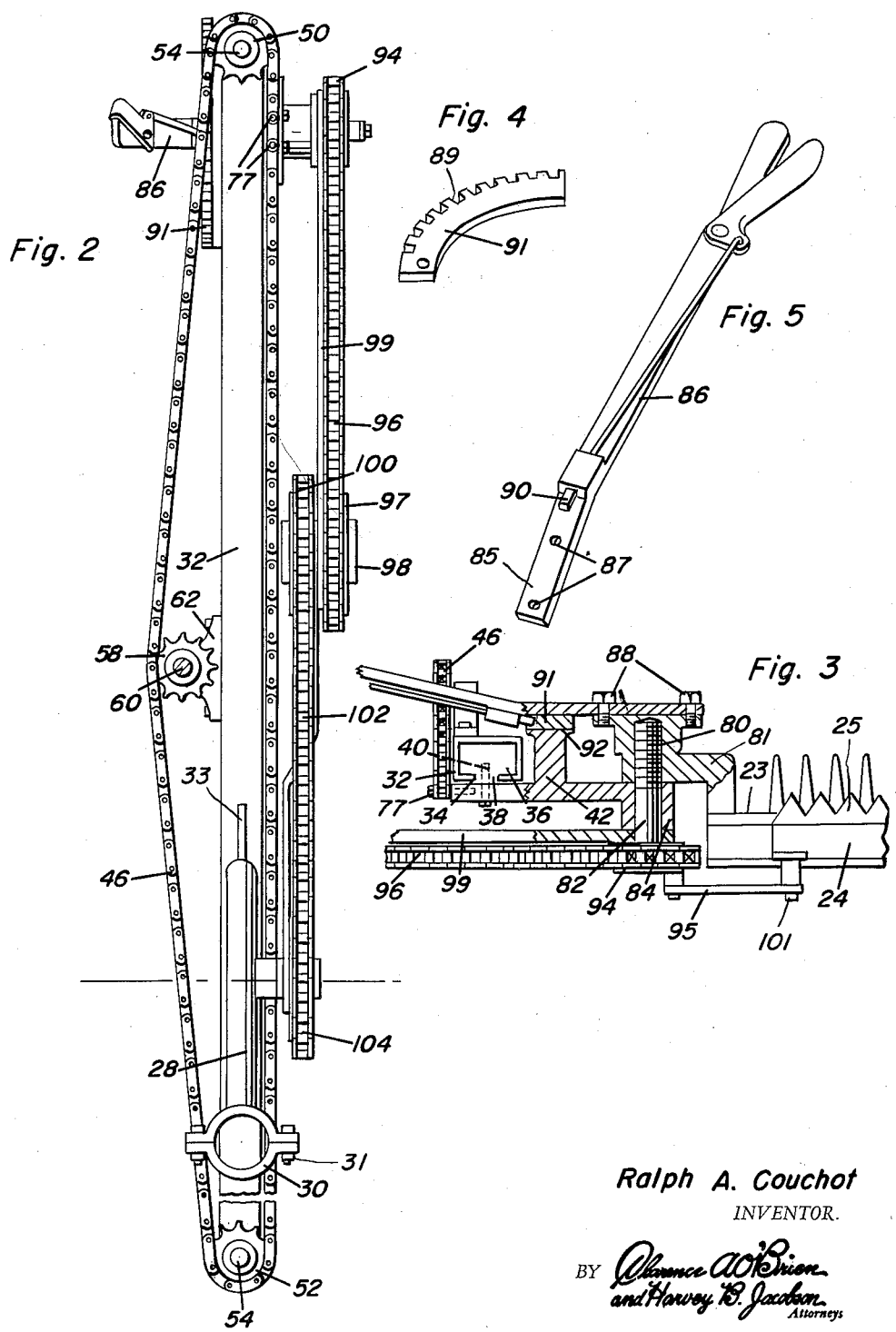
Ralph A. Couchot
INVENTOR.

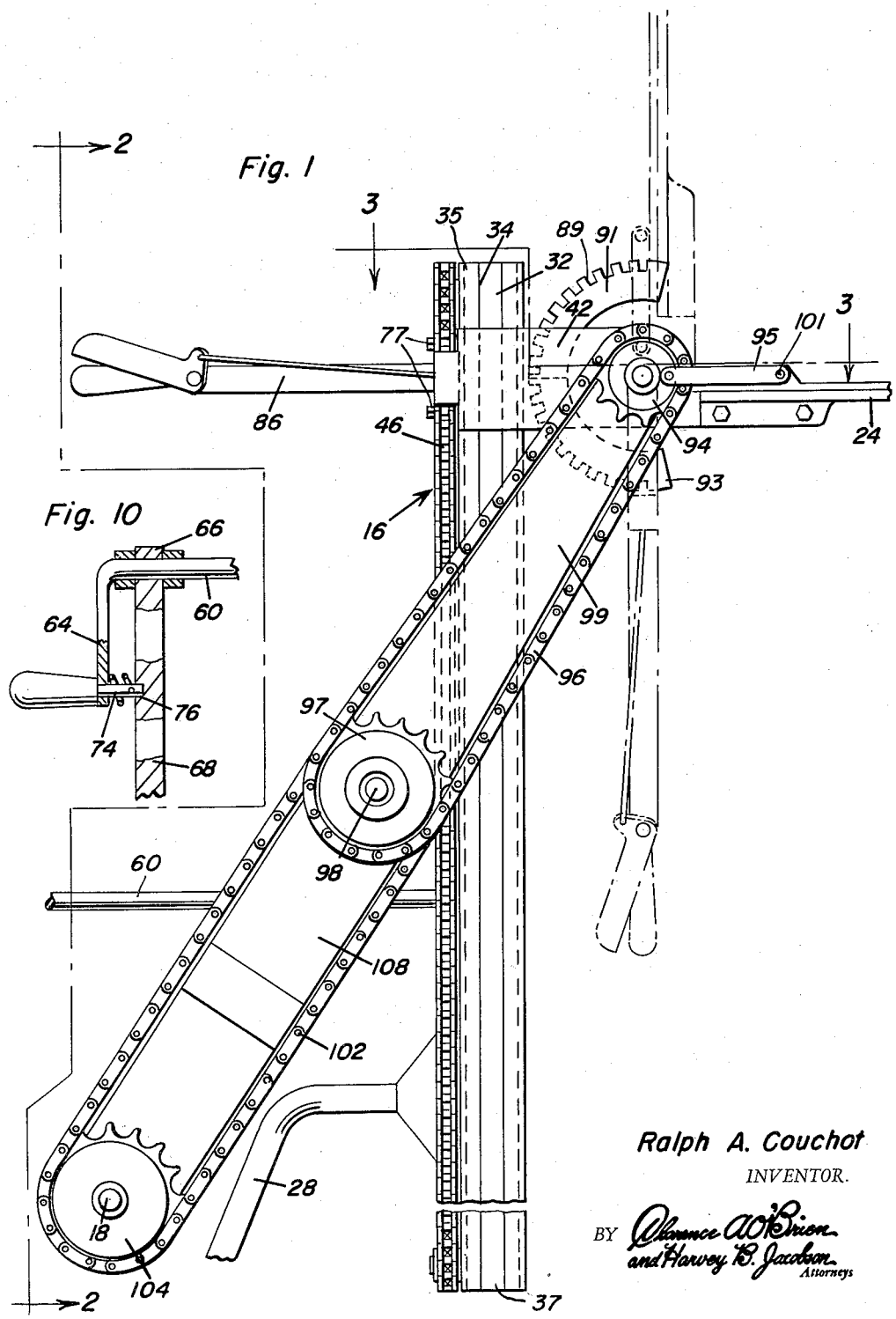
Ralph A. Couchot
INVENTOR.

Ralph A. Couchot
INVENTOR.

March 20, 1962 — R. A. COUCHOT — 3,025,655
HEDGE TRIMMER
Filed Sept. 17, 1959 — 4 Sheets-Sheet 4
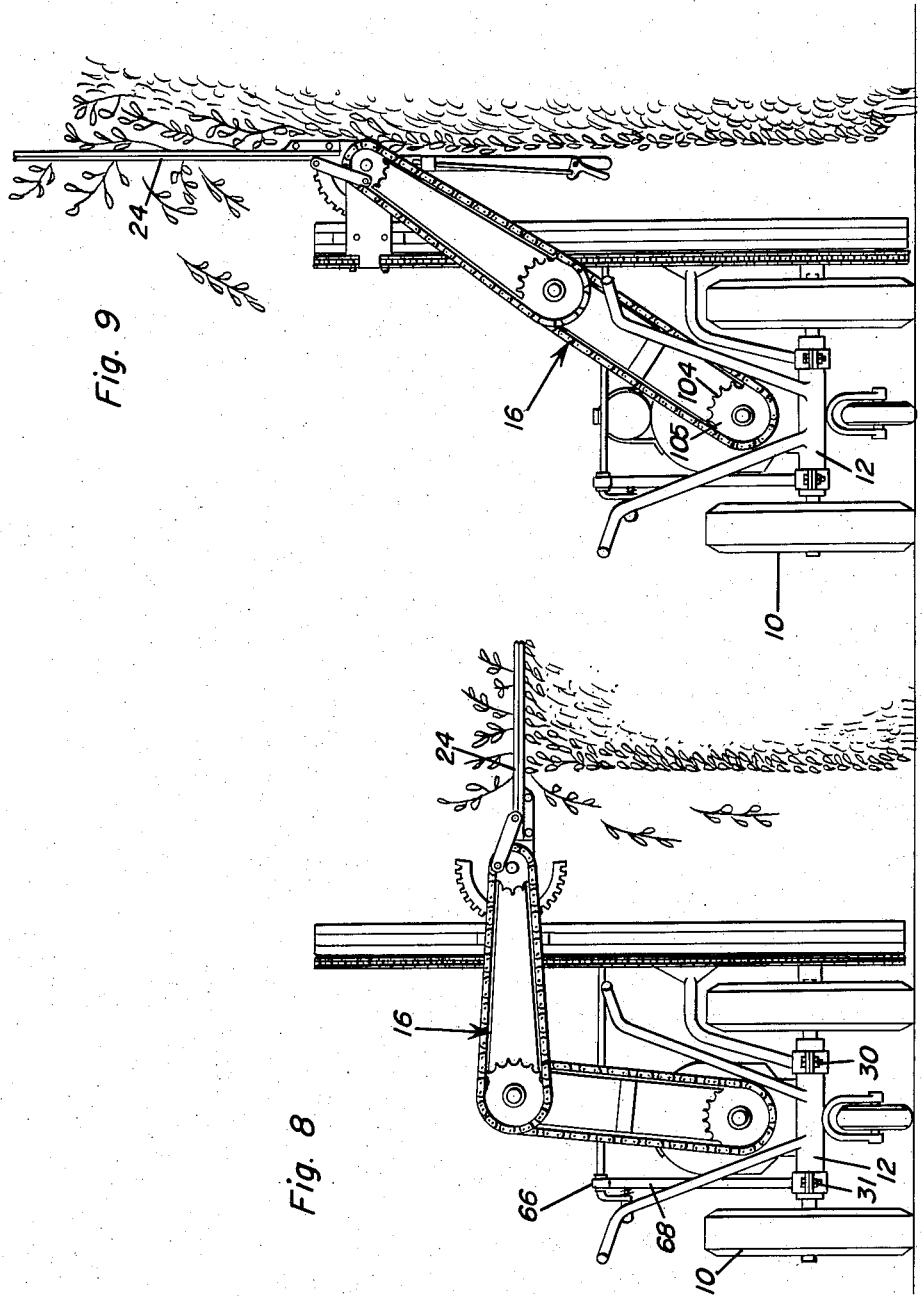
Ralph A. Couchot
INVENTOR.

United States Patent Office 3,025,655
Patented Mar. 20, 1962

3,025,655
HEDGE TRIMMER
Ralph A. Couchot, 302 W. Kentucky St., Tucson, Ariz.
Filed Sept. 17, 1959, Ser. No. 840,642
4 Claims. (Cl. 56—233)

This invention relates to a multi-purpose device for trimming hedge, cutting grass, weeds, etc., and for performing these functions at different angularities, depending upon the desires of the user.

Although there are machines on the market for performing various trimming operations, the trimmer, in accordance with the invention, performs the trimming operations in a much more versatile manner. The trimmer is installed as an attachment on any powered vehicle, for instance, a garden tractor, it being understood of course that its installation is not necessarily restricted thereto. The attachment includes a reciprocating cutter which may be positioned in numerous ways. For example, it may be adjusted to a low position to cut weeds or for low trimming. It may be positioned horizontally at any elevation within the height of the attachment. It may be vertically positioned for either low cutting or high cutting, and it may be positioned at any angle between horizontal and vertical references.

The cutter is mounted on a novel adjustment mechanism and this includes a drive transmission between a power take-off of the vehicle so that the cutter is capable of complete, full and satisfactory operation throughout the wide range of angular and elevational adjustments.

An important feature of the invention is found in the simplicity of manipulation. Only one operating lever is used to adjust the angularity of the cutter, and one hand crank is used for adjusting the height of the cutter regardless of angularity.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of the attachment which forms the trimmer;

FIGURE 2 is a sectional view taken on the line 2—2 of FIGURE 1;

FIGURE 3 is a sectional view taken on the line 3—3 of FIGURE 1;

FIGURE 4 is a perspective view of the quadrant constituting a part of the locking mechanism for the angularity of the cutter;

FIGURE 5 is a perspective view of the operating lever for adjusting the angular position of the cutter;

FIGURE 8 is an elevational view showing the trimmer in a further adjusted position;

FIGURE 9 is an elevational view showing the trimmer further adjusted for cutting high hedges after the low part of the same hedge has been cut with the trimmer adjusted as shown in FIGURE 6;

FIGURE 10 is an enlarged partial elevational view with parts shown in section of the handle lock detail.

Figure 7:
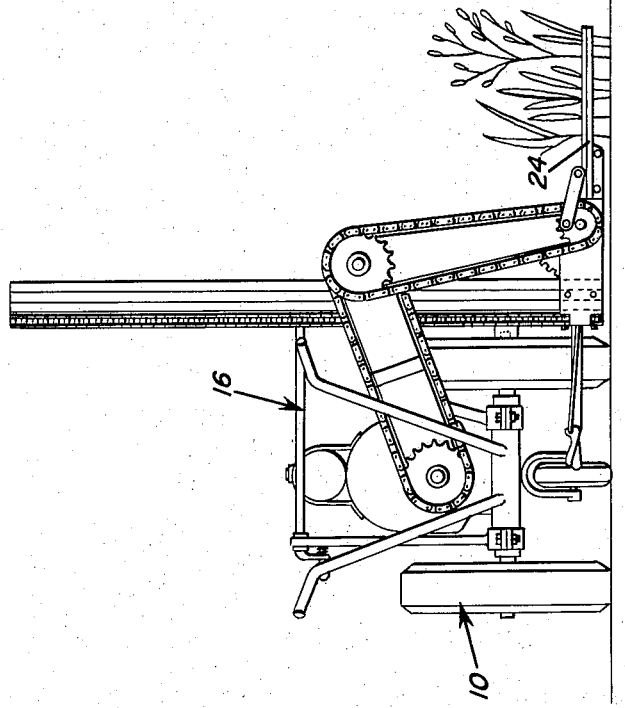
FIGURE 7 is an elevational view similar to FIGURE 6 but showing the trimmer in another adjusted position.

In the accompanying drawings, reference is first made to FIGURES 6–10, showing only four of the numerous possible positions of adjustment of the trimmer. There is disclosed a small vehicle 10 which may be a garden tractor of the type operated by a walking attendant. Since the tractor is conventional, the various details thereof are omitted. However, the chassis 12 is identified because the attachment 16 constituting one embodiment of the invention is secured thereto. Further, power take-off shaft 18, rotatable about a fixed horizontal axis, is identified in the tractor inasmuch as this is used for operating the reciprocating cutter of the attachment. The axle housing 12 of the vehicle chassis, rotatably mounts the wheels 20 of the tractor on the outboard sides of the vehicle.

Figure 6:
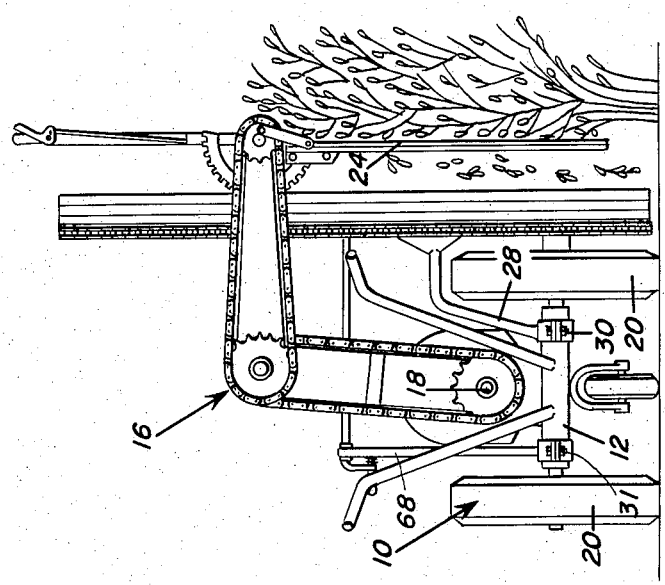
FIGURE 6 is a rear elevational view showing the trimmer in one adjusted position.

FIGURE 6 shows the cutter 24 adjusted so that it is in a vertical plane and extending downwardly from its mounting so that the outer end of the cutter is comparatively low. FIGURE 7 shows the cutter 24 in an essentially horizontal position and close to the ground so that weeds can be cut or high grass trimmed. FIGURE 8 discloses cutter 24 in a horizontal plane and at the elevation wherein the user desires the hedge to be trimmed. FIGURE 9 illustrates the cutter 24 in a vertical position but extending upward instead of downward, as shown in FIGURE 6, in order to trim high hedge. Although the term "hedge" is used herein, it is immediately evident that the principles of the invention are not restricted to trimming hedge in that any other suitable growth may be trimmed with comparatively equal facility. Furthermore, FIGURES 6–9 are only diagrammatical representations of a few of the possible positions of the cutter 24. No angular positions are shown, although it is quite evident that the cutter may be placed in any angular relationship, for instance, in cutting on a slope or for cutting hedges at an angle.

Trimmer attachment 16 has a supporting frame 28 with a clamp 30 at the lower end thereof suitably clamped on the axle housing 12 of vehicle 10 by fasteners 31. The frame 28 is firmly secured to a vertical rail 32 as by welding at 33 made in the form of a box beam having a vertical slot 34 (FIGURES 1 and 3) throughout the length thereof and in one of its walls. Carriage block 36 is slidably mounted in the rail 32 and has a short part 38 extending through the slot 34. The carriage block is rigidly secured, for instance, by bolts 40, to carriage 42 which protrudes laterally outwardly from the vertical rail. The carriage 42 is vertically adjustable throughout the full length of the rail inasmuch as it is secured to endless chain 46 which extends from the top to the bottom of the rail. Chain 46 is entrained over upper sprocket 50 and lower sprocket 52, each mounted for rotation on spindles 54 which are suitably carried at upper and lower ends 35 and 37 of the rail. Drive sprocket 58 is engaged with one flight of the endless chain 46 and is at the inner end of a shaft 60. The shaft is mounted for rotation in a bearing 62 that is secured to rail 32 intermediate the upper and lower ends thereof. As shown in FIGURE 10, shaft 60 has a crank 64 at the outer extremity thereof by which to turn the shaft, and the shaft extends through a bearing 66 at the upper end of a brace 68, the lower end of which has a clamp 31 identical to clamp 30 and attached to chassis 12. Spring detent 74 is connected with the crank handle and is spring projected in an opening 76 formed in the brace 68 to hold the crank handle, and hence shaft 60, in a selected adjusted position. The operation of the trimmer will be described in stages along with the structure thereof. Accordingly, the operation of the means for adjusting carriage 42 is as follows: The operator turns the handle of crank 64 and this turns shaft 60. Shaft 60 rotates the sprocket 58 which is fixed thereto, and this causes the chain 46 to be moved as constrained by the upper and lower sprockets 50 and 52. Since the carriage 42 is secured to the chain by means of bolts 77 (FIGURE 3), the carriage is moved up or down, depending on the direction of rotation of shaft 60, and carriage block 36 held captive in rail 32 constrains the movement of the carriage 42. The cutter 26 is ultimately carried by carriage 42, and consequently the vertical height, that is, the elevation, of the cutter is consequently regulated.

The cutter 24 is a conventional cutter insofar as the ledger plate 23 and movable cutter bar 25 are concerned. However, the ledger plate has mechanical fastening means including an internally threaded boss 80 at the inner end 81 thereof within which spindle 82 is received. This spindle is passed through a bearing 84 of carriage 42 (FIGURE 3), enabling the ledger plate, and consequently the entire cutter 24, to be adjustably moved about the longitudinal axis of spindle 82. Hand lever 86 has a flattened end 85 with apertures 87 therein to receive bolts 88 (FIGURE 3) by which to bolt the hand lever onto the boss 80. The conventional latch 90 is connected with the hand lever 86, and it cooperates with segment plates 91 and 93 which are bolted or otherwise secured to a flat surface 92 of carriage 42. The segment is made in two parts 91 and 93 to facilitate construction and assembly, and when put together they form an approximate semicircle (FIGURE 1) and the notches 89 therein cooperate with latch 90 to hold the lever 86 in a selected adjusted position. When so adjusted, the cutter 24 is angularly adjusted about the longitudinal axis of pivot 82. Referring to FIGURES 6-9, it is quite evident that numerous angular positions of the cutter 24 are possible.

Positive articulated transmission drive means is provided and is drivingly connected with the reciprocating cutter bar of cutter 24 to reciprocate that cutter bar at any position of adjustment of the cutter bar with respect to the power take-off 18. These means consist of a free turning sprocket 94 mounted for rotation on spindle 82 (FIGURE 3) together with a pitman 95 eccentrically and pivotally connected to a face of sprocket 94 and pivotally connected in the usual way at pivot 101 to the reciprocating cutter bar of cutter 24. The first sprocket chain 96 is entrained around sprocket 94 and around a sprocket 97 which is mounted for rotation on a knuckle spindle 98. This knuckle spindle extends through an aperture in an elongate plate 99, over the side edges of which chain 96 is operable. A second sprocket 100 is mounted for rotation on the same spindle 98, and there is a second chain 102 engaged with the teeth thereof. The chain is also engaged with the teeth 104 of a sprocket 105 that is connected to the power take-off shaft 18 of the small vehicle. A reinforced plate 108 quite similar to plate 99 has apertures through which shaft 18 extends and through which spindle 98 extends.

In operation of the means for actuating the cutter 24, power is taken from shaft 18 and applied through chains 102 and 96, respectively, as well as the intermediate sprockets engaged therewith, and especially free turning sprocket 94 to which pitman 95 is pivotally connected. Inasmuch as the plates 99 and 108 are articulatively connected (compare FIGURES 9 and 8), the power may be transmitted in a positive manner to the cutter in any position, the plates 99 and 108 together with the sprocket chains thereon being articulated in response to vertical movement of the carriage 42 to assume the various desired adjusted positions of the cutter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a trimmer for a vehicle, a vertical hollow rail having an elongate slot, a carriage block slidably movable in said slot, a carriage attached to said carriage block stationary, mechanical drive means drivingly connected with said carriage to move said carriage and said carriage block vertically of said rail, with said carriage block having a portion projecting through the slot in said rail and thereby constraining the motion of said carriage with respect to said rail, cutter means driven from a power source on the vehicle, a spindle rotatably carried by said carriage, said cutter means being attached to said spindle thereby mounting said cutter on said carriage for pivotal movement about the longitudinal axis of said spindle, a lever connected with said cutter means to adjust said cutter means on said spindle, locking means connected between said lever and said carriage to retain said cutter in selected angular positions.

2. In a trimmer for a vehicle, a vertical hollow rail having an elongate slot, a carriage block in said slot, a carriage attached to said carriage block, mechanical means connected with said carriage to move said carriage and said block vertically of said rail, with said carriage block having a portion projecting through the slot in said rail and thereby constraining the motion of said carriage with respect to said rail, a cutter, a spindle carried by said carriage, said cutter attached to said spindle thereby mounting said cutter on said carriage for pivotal movement about the longitudinal axis of said spindle, a lever connected with said cutter to adjust said cutter on said spindle, locking means connected between said lever and said carriage to retain said cutter in selected angular positions, said mechanical means for vertically adjusting said carriage on said rail including an endless chain, means securing said endless chain to said carriage, an adjustment shaft rotatable about a fixed axis, a sprocket connected with said adjustment shaft and in engagement with said chain in order to operate said chain and thereby move said carriage.

3. In a trimmer for a vehicle, a supporting frame, a vertical hollow rail mounted on the frame having an elongate slot, a carriage block in said slot, a carriage attached to said carriage block, mechanical means connected with said carriage to move said carriage and said block vertically of said rail, with said carriage block having a portion projecting through the slot in said rail and thereby constraining the motion of said carriage with respect to said rail, a cutter, a spindle carried by said carriage, said cutter attached to said spindle thereby mounting said cutter on said carriage for pivotal movement about the longitudinal axis of said spindle, a lever connected with said cutter to adjust said cutter on said spindle, locking means connected between said lever and said carriage to retain said cutter in selected angular positions, said mechanical means for vertically adjusting said carriage on said rail including an endless chain, means securing said endless chain to said carriage, an adjustment shaft rotatable about a fixed axis, a sprocket connected with said adjustment shaft and in engagement with said chain in order to operate said chain and thereby move said carriage, a crank connected with said adjustment shaft, and means associated with said crank and mechanically engageable with said supporting frame for holding said crank and said adjustment shaft in a selected adjusted position.

4. A trimmer attachment for a vehicle having a power take-off shaft rotatable about a fixed horizontal axis comprising, vertically disposed rail means mounted on said vehicle to one lateral side thereof, carriage means slidably mounted on said rail means, elevation control means rotatably mounted on the vehicle and drivingly connected to said carriage means for slidable movement thereof along the rail means, angularly adjustable cutter means mounted on the carriage means and articulated transmission means pivotally connected to the carriage means and to the vehicle about said fixed axis drivingly connecting the cutter means to the power take-off shaft for all elevational positions of the carriage means.

References Cited in the file of this patent

UNITED STATES PATENTS

| | | |
|---|---|---|
| 2,465,796 | Freeman | Mar. 29, 1949 |
| 2,483,772 | Holmes | Oct. 4, 1949 |
| 2,762,186 | Janata | Sept. 11, 1956 |

FOREIGN PATENTS

| | | |
|---|---|---|
| 13,033 | Great Britain | 1891 |
| 391,898 | Great Britain | May 11, 1933 |
| 678,862 | Great Britain | Sept. 10, 1952 |
| 1,104,925 | France | June 22, 1955 |